United States Patent Office 3,249,626
Patented May 3, 1966

3,249,626
NEW ANTHRAQUINONE DYESTUFFS
Rütger Neeff and Otto Bayer, Leverkusen-Bayerwerk, Germany, assignors to Farbenfabriken Bayer Aktiengesellschaft, Leverkusen, Germany, a corporation of Germany
No Drawing. Filed Oct. 7, 1959, Ser. No. 844,866
Claims priority, application Germany, Oct. 11, 1958, F 26,787; Aug. 6, 1959, F 29,116
16 Claims. (Cl. 260—329.2)

The present invention relates to new anthraquinone dyestuffs and to a process of producing the new anthraquinone dyestuffs.

In accordance with the invention it has been found that valuable anthraquinone dyestuffs are obtained by reacting anthraquinones which are substituted in 1-position by a hydroxy- or alkoxy- or hydroxyalkylamino group and which carry in 4-position a substituent which can be replaced by a substituted amino group, with 3-amino-tetrahydrothiophene-1,1-dioxide and, if desired, treating the dyestuffs thus obtained with halogenating agents.

The anthraquinone derivatives used for the production of the anthraquinone dyestuffs according to the present invention may carry further substitutents, e.g. halogen atoms, hydroxy-, nitro- or optionally substituted amino groups. Examples of such anthraquinone derivatives are 1 - hydroxy - 4 - nitro - anthraquinone, 1 - methoxy - 4-nitro - anthraquinone, 1 - methoxy - 4 - chloro - anthraquinone, 1 - methoxy - 4 - bromo - anthraquinone, 1-(hydroxy - ethyl) - amino - 4 - bromo - anthraquinone, 1,5 - dihydroxy - 4,8 - dinitro - anthraquinone and 1,8-dihydroxy - 4,5 - dinitro - anthraquinone as well as leuco-1,4 - dihydroxy - anthraquinone, which may be used in admixture with 1,4 - dihydroxy - anthraquinone, or leuco-1,4,5,8-tetrahydroxy-anthraquinone. The alkyl radicals used in the process of the invention are those containing up to 4 carbon atoms.

The anthraquinone derivatives can be reacted with the 3 - amino - tetrahydrothiophene - 1,1 - dioxide according to the processes usually applied in the anthraquinone chemistry. The reaction is preferably carried out at temperatures between 50 and 140° C. in the presence of inert solvents, e.g. alcohols, glycol monomethyl ether, glycol monoethyl ether, pyridine and nitrobenzene.

As far as leuco-anthraquinones are used in the reaction, the resulting leuco-compounds are subsequently liberated from their leuco hydrogen by oxidation in usual manner.

Suitable halogenating agents according to the invention are halogens such as chlorine or bromine as well as halogen-yielding agents, e.g. sulfuryl chloride. Halogenation can be carried out in usual manner, preferably at slightly elevated temperature. Good results are obtained e.g. when processing at temperatures between 40–130° C., although if desired higher temperatures can be applied. Halogenation can be accomplished e.g. by dissolving the dyestuffs to be halogenated in dilute, concentrated or weakly fuming sulfuric acid, in concentrated hydrohalic acid or in organic inert solvents, e.g. halogen or nitro-benzenes, and adding halogen or a halogen-yielding compound; there can be used also mixtures of different halogens. It is of advantage to add to the reaction mixture boric acid and/or catalysts usually applied in halogenation processes, e.g. iodine.

The new dyestuffs obtained according to the invention, which can be defined by the general formula

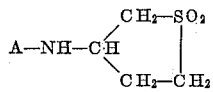

wherein A stands for an anthraquinone radical containing the substituent in 4-position, and wherein the anthraquinone radical may be substituted in the aforedescribed manner, dye synthetic fibers consisting e.g. of cellulose acetates, polyamides or polyesters, in red or blue shades according to conventional methods. The dyeings thus obtained show very good fastness properties, in particular a very good fastness to light, washing, gas fumes, ironing and sublimation.

The dyestuffs which have been subjected to a halogenation process according to the invention are distinguished from the non-halogenated dyestuffs by an improved fiber affinity, the fastness properties being unchanged. The shade of the halogenated dyestuffs more or less deviates, depending on the halogen content, from the shade of the non-halogenated dyestuffs. It is of advantage to use dyestuffs containing about 0.25–1.5, preferably 0.25–1, halogen atoms per anthraquinone molecule. These figures indicate a mathematical mean value, since the dyestuffs obtained by the process of the invention are a mixture of non-halogenated dyestuffs and dyestuffs of varying halogen content, especially mono- and dihalogenated dyestuffs. If the total halogen content is high, the proportion of higher halogenated anthraquinone dyestuffs is of course larger than in the case of low halogen content.

The invention is further illustrated by the following examples without being restricted thereto, the parts being given are parts by weight if not otherwise stated.

Example 1

(a) 8 parts of quinizarin, 2.5 parts of leuco quinozarin, 6 parts of boric acid in 40 parts of ethanol are reacted at boiling temperature within 10 hours with a solution of 8 parts of 85 percent 3-amino-tetrahydrothiophene-1,1-dioxide in 16 parts of ethanol. Boiling is continued for about 12 hours until completion of the dyestuff formation and the resulting leuco compound is then oxidised by slowly adding a solution of 3 parts of sodium perborate in 25 parts of water. After cooling the precipitated dyestuff is filtered off with suction and washed with a mixture of equal parts of ethanol and water. The dry dyestuff, which corresponds to the formula

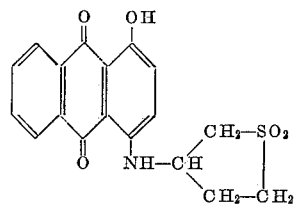

is transformed in known manner into a finely dispersed form, e.g. by pasting it with 80 percent of sulfuric acid, grinding the neutrally washed paste with sulfite cellulose waste liquor and an alkyl naphthalene sulfonic acid and subsequent drying.

Halogenated dyestuffs are obtainable by the following processes:

(b) 18 parts of the dyestuff obtained according to Example 1a are reacted in 150 parts of o-dichlorobenzene with 3.95 parts of bromine and 0.1 part of iodine. The mixture is heated to 55° C. for about 4 hours and then to 75° C. for 2–3 hours and the o-dichlorobenzene is distilled off with steam. 19 parts of a dyestuff containing about 5 percent bromine are thus obtained. The dry dyestuff is transformed in known manner into a finely dispersed form, e.g. by pasting it with 80 percent of sulfuric acid, grinding the neutrally washed paste with sulfite cellulose waste liquor and an alkyl naphthalene sulfonic acid.

(c) 18 parts of the dyestuff obtained according to Example 1a are reacted in 150 parts of dry nitrobenzene with 0.1 part of iodine and, within 60 minutes at 50° C., with 23.8 parts of bromine. After stirring at 50° C. for about 60 minutes and then at 75° C. for a further 2 hours and distilling off the nitrobenzene with steam, a dyestuff containing about 23 percent bromine is obtained. As compared with the non-halogenated dyestuff used as starting product, which yields red violet dyeings, the new dyestuff dyes polyester fibers in red shades, the affinity being markedly improved.

(d) 18 parts of the dyestuff obtained according to Example 1a are dissolved in 185 parts of sulfuric acid monohydrate and mixed with stirring with 5 parts of boric acid for about 60 minutes. 0.1 part of iodine and 5 parts of bromine are added and the mixture is stirred at 50–70° C. until the bromine is consumed. The reaction mixture is poured on ice, the precipitate formed is filtered off with suction and washed neutral. About 20 parts of a red-violet dyestuff containing about 10 percent bromine are thus obtained. The dyestuff dyes polyester fibers redder shades than the starting dyestuff, the affinity being improved.

(e) 18 parts of the dyestuff obtained according to Example 1a are reacted in 200 parts of o-dichlorobenzene with 20 parts of sulfuryl chloride and stirred at 60° C. for 2 hours. After distilling off the o-dichlorobenzene with steam a dyestuff containing 17 percent chlorine is obtained. The dyestuff has a markedly improved affinity for polyester fibers and yields redder shades than the starting dyestuff.

(f) 18 parts of the dyestuff obtained according to Example 1a, 5 parts of boric acid and 0.5 part of iodine are dissolved in 180 parts of sulfuric acid monohydrate and stirred with 3 parts of bromine at 50–70° C. until the dyestuff has adsorbed about 5 percent of bromine. The dyestuff is subsequently chlorinated at 50–70° C. by introducing chlorine until the dyestuff contains, in addition to 5 percent bromine, about 3 percent chlorine. The dyestuff thus obtained has an improved affinity for polyester fibers and yields redder shades than the dyestuff obtained according to Example 1a.

(g) A dye bath is prepared containing a dispersion of 1 part of the dyestuff obtained as described in Examples 1a to f and 20 parts of cresotic acid methyl ester in 4000 parts of water, and buffered with sulfuric acid to a pH value of 4.5. 100 parts of polyethylene glycol terephthalate fibers are placed at 50° C. in the dye bath which is heated to 100° C. within 20–30 minutes and kept at this temperature for 90 minutes. After rinsing and drying the fiber, very bright dyeings are obtained which are distinguished by a very good fastness to washing and light as well as an excellent stability to heat.

(h) If the dyeing process is carried out in the absence of cresotic acid methyl ester at 125° C. for 60–90 minutes, a very bright dyeing with similar fastness properties is obtained.

*Example 2*

10 parts of 1,5-dihydroxy-4,8-dinitro-anthraquinone are heated with 25 parts of 85 percent 3-amino-tetrahydro-thiophene-1,1-dioxide in 100 parts of glycol monomethyl ether to 110–115° C. until the whole starting material has disappeared and a paper chromatogram of the reaction product developed with pyridine shows a pure blue chromatogram. After cooling the melt is added with stirring to 500 parts of 2n-hydrochloric acid, the precipitated dyestuff filtered off with suction and washed neutral. After dispersion in usual manner the dyestuff thus obtained which can be characterized by the following formula

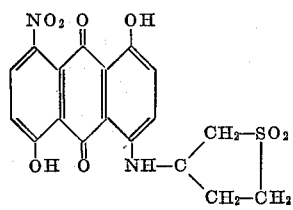

dyes polyester and polyamide fibers blue shades which are distinguished by a very good fastness to washing and light and stability to heat.

(b) If in the process described in the preceding example, 10 parts of 1,8-dihydroxy-4,8-dinitroanthraquinone are used instead of 1,5-dihydroxy-4,8-dinitro-anthraquinone, a dyestuff is obtained which yields somewhat greener shades.

(c) 15 parts of the dyestuff obtained according to Example 2a are heated in 150 parts of o-dichlorobenzene with 0.1 part of iodine and 3.5 parts of bromine to 80° C. for about 10 hours. After distilling off the o-dichlorobenzene with steam, 15.5 parts of a dyestuff containing about 6 percent bromine are obtained. The dyestuff dyes polyester fibers redder shades than the non-halogenated starting dyestuff and is superior to the starting dyestuff as regards affinity.

*Example 3*

(a) 24 parts of leuco quinizarin, 8.6 parts of ethanol amine, 8.7 parts of 84 percent 3-amino-tetrahydrothiophene-1,1-dioxide are heated with 120 parts n-butanol to 100° C. for 6 hours. The leuco product which is isolated after cooling in beautiful blue prismatic crystals is dehydrogenated by heating at 150° C. in 210 parts of nitrobenzene in the presence of 1.4 parts of piperidine, filtered off after cooling and washed with petroleum ether. After dispersing in known manner, the dyestuff dyes fibers of cellulose acetate and polyamides pure blue bright shades of good fastness properties. The dyestuff corresponds to the formula

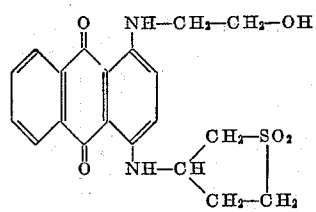

(b) Cellulose acetate can be dyed by the following procedure:

A dye bath is prepared consisting of 3000 parts of water, 1 part of one of the dyestuffs described in this invention and 6 parts of the condensation product of naphthalene sulfonic acid and formaldehyde. Into this dye bath there are introduced 100 parts of cellulose acetate fibers at 40° C. Within 20 to 25 minutes the temperature of the dye bath is brought to about 65 to 85° C. and the cellulose acetate fibers are dyed therein for a further hour. The fiber materials are thereafter rinsed and dried.

(c) Polyamide fibers can be dyed, for example, by the following method:

A dyebath is prepared which contains in 4000 parts of water 1 part of one of the dyestuffs prepared according to the instant invention and 10 parts of a mixture of the sodium salt of paraffin sulfonic acid, oleyl polyglycol ether and fatty acid hydroxy benzylamide polyglycol ether. 100 parts of a polyamide fiber are introduced into this dye bath at 25° C. Within 45 minutes the temperature of the dye bath is brought to about 100° C. and the fibers are dyed therein for a further hour. Thereafter the fibers are rinsed and dried.

We claim:

1. A compound of the formula

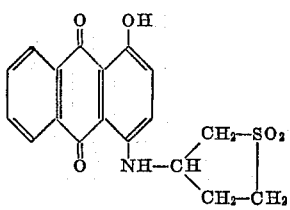

2. A brominated mixture of an anthraquinone of the formula

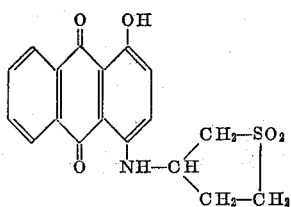

said mixture having an average bromine content of about 5 percent.

3. A brominated mixture of an anthraquinone of the formula

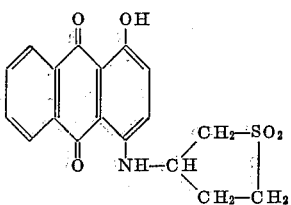

said mixture having an average bromine content of about 10 percent.

4. A compound of the formula

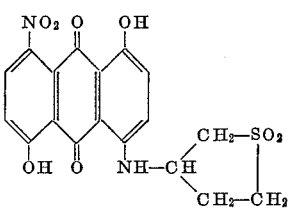

5. A compound of the formula

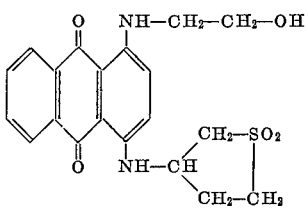

6. An anthraquinone of the formula

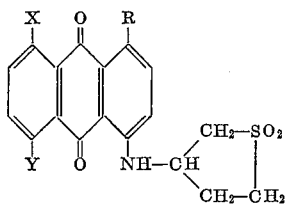

wherein R represents a member selected from the group consisting of hydroxy, lower alkoxy and hydroxy lower alkylamino and X and Y are each a member selected from the group consisting of hydrogen, hydroxy and nitro.

7. A chlorinated product of an anthraquinone of claim 6, said product being a mixture having an average chlorination content of 0.25 to 1.5 chlorine atoms per anthraquinone molecule.

8. A brominated product of anthraquinone of claim 6, said product being a mixture having an average bromine content between 0.25 to 1.5 bromine atoms per anthraquinone molecule.

9. A brominated mixture of an anthraquinone of the formula

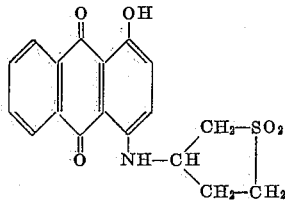

said mixture having an average bromine content of 5% to 10%.

10. A bromine-containing anthraquinone of the formula

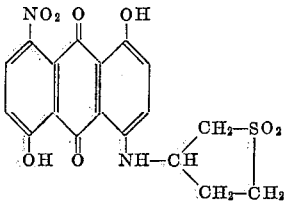

containing between .25 to 1.5 bromine atoms per anthraquinone molecule.

11. A chlorine-containing anthraquinone of the formula

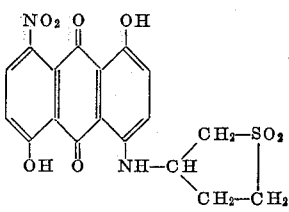

containing between .25 to 1.5 chlorine atoms per anthraquinone molecule.

12. A bromine-containing compound of the formula

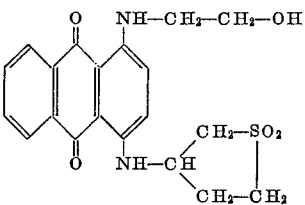

containing between .25 to 1.5 bromine atoms per anthraquinone molecule.

13. A chlorine-containing compound of the formula

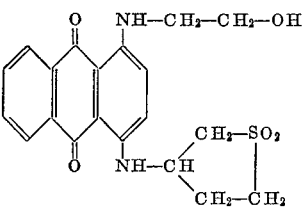

containing between .25 to 1.5 chlorine atoms per anthraquinone molecule.

14. An anthraquinone dyestuff selected from the group consisting of (a) an anthraquinone having the formula

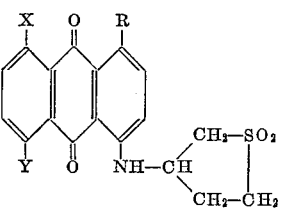

wherein R represents a member selected from the group consisting of hydroxy, lower alkoxy and hydroxy lower alkylamino, and X and Y are each a member selected from the group consisting of hydrogen, hydroxy and nitro; and (b) a halogenated product thereof, said halogenated product being a mixture having an average halogen content within the range of 0.25 to 1.5 halogen atom per anthraquinone molecule, said halogen atom selected from the group consisting of bromine and chlorine.

15. An anthraquinone dyestuff selected from the group consisting of (a) an anthraquinone of the formula

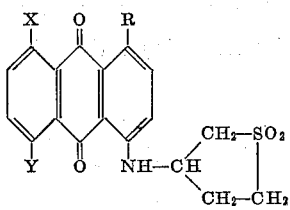

wherein R represents a member selected from the group consisting of hydroxy, lower alkoxy and hydroxy lower alkylamino, and X and Y are each a member selected from the group consisting of hydrogen, hydroxy and nitro, and (b) a halogenated product thereof, said halogenated product being a mixture having an average halogen content within the range of 0.25 to 1 halogen atom per anthraquinone molecule, said halogen atom selected from the group consisting of bromine and chlorine.

16. A compound of the formula

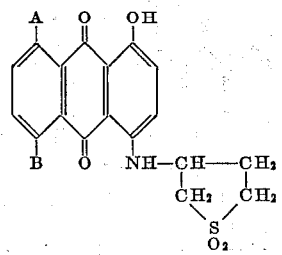

wherein A and B represent a member selected from the group consisting of hydrogen, hydroxy and nitro.

References Cited by the Examiner
UNITED STATES PATENTS 2,862,930   12/1958   Caliezi et al. _____ 260—314.5
2,895,967   7/1959    Straley et al. _____ 260—366

OTHER REFERENCES

Lubs, Chemistry of Synthetic Dyes and Pigments, Reinhold Publishing Corporation, New York, N.Y., 1955, page 345.

WALTER A. MODANCE, *Primary Examiner.*

IRVING MARCUS, H. J. LIDOFF, DUVAL T. McCUTCHEN, *Examiners.*